Nov. 21, 1933.                    C. F. PRUTTON                    1,936,543
             PROCESS FOR MAKING IRON CHLORIDES AND SULPHUR DIOXIDE
                      FROM IRON PYRITES AND DILUTE CHLORINE
                              Filed May 9, 1930
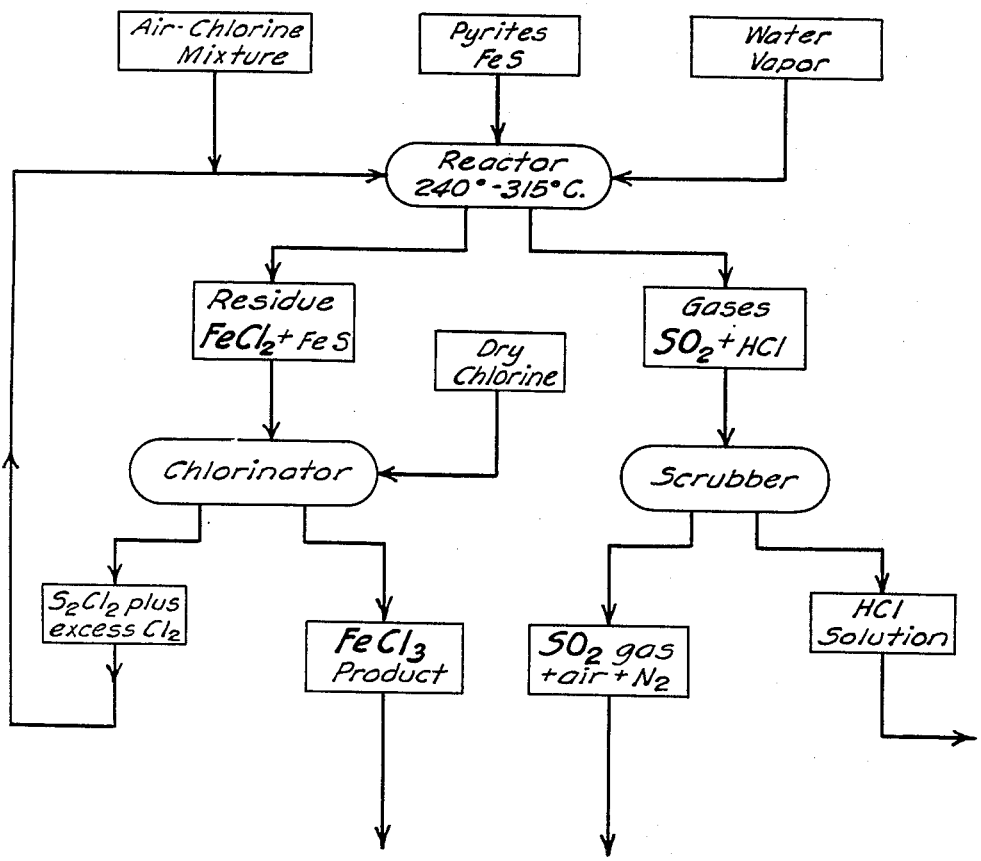
INVENTOR
*Carl F. Prutton*
BY
*Thomas Griswold, Jr.*
ATTORNEY Patented Nov. 21, 1933

1,936,543

UNITED STATES PATENT OFFICE 1,936,543

PROCESS FOR MAKING IRON CHLORIDES AND SULPHUR DIOXIDE FROM IRON PYRITES AND DILUTE CHLORINE

Carl F. Prutton, Cleveland, Ohio, assignor to The Dow Chemical Company, Midland, Mich., a corporation of Michigan Application May 9, 1930. Serial No. 451,202

6 Claims. (Cl. 23—177)

The present invention relates to the manufacture of iron chlorides and sulphur dioxide conjointly, by reacting iron pyrites with a mixture of chlorine and air.

I have found that iron sulphide, or ores or mattes containing the same, will react readily with chlorine gas diluted with air, and that under proper operating conditions, iron chlorides and sulphur dioxide of satisfactory quality may be obtained. Such dilute chlorine gas, i. e., such a gas containing fifteen per cent or less of chlorine, which is produced in certain processes or is a waste product in others may be utilized in carrying out my improved process. Iron pyrites is an abundant raw material available at relatively low cost with respect to the sulphur content and is readily reactable with chlorine and oxygen. To the accomplishment of the foregoing and related ends, the invention, then, consists of the steps hereinafter fully described and particularly pointed out in the claims, the annexed drawing and following description setting forth in detail one mode of carrying out the invention, such disclosed mode illustrating, however, but one of various ways in which the principle of the invention may be used.

In the said annexed drawing:—

The single figure is a flow sheet illustrating one preferred mode of carrying out the process of the invention.

In carrying out my improved process the iron sulphide is dried and preferably finely ground. It is heated to a temperature between about 240° and 315° C. with stirring, while dilute chlorine gas is contacted therewith either with or without the presence of water vapor. Fine grinding of the sulphide is advantageous, although not absolutely necessasry. A ground pyrite, the bulk of which will pass 200 mesh screen, is a very desirable raw material. It is here noted that the ratio of the chlorine gas to that of the oxygen should preferably not exceed unity (1:1). In the absence of moisture the following equation illustrates the principal reaction:

(1)  $FeS_2 + Cl_2 + 2O_2 \rightarrow FeCl_2 + 2SO_2$

Some sulphur chloride is, however, formed and will be present in the $SO_2$ gas and may also contaminate the $FeS_2$ and ferrous chloride to produce a sticky condition thereof. However, if moisture be present, such sulphur chloride will be decomposed and stickiness diminished, with production of HCl. The presence of an excess of water vapor is, however, undesirable, because the ferrous chloride will take it up and become difficult of handling, both in carrying out reaction (2) below, and in further reacting, if desired, to form anhydrous ferric chloride in a later step. By controlling the temperature and the quantity of water vapor introduced the formation of HCl may be limited to that resulting from the decomposition of the sulphur chloride. The reaction products are known to vary widely with changes of temperature, but at temperatures in the neighborhood of 280 C., for instance, the following empirical equation has been found to represent the reaction taking place:

(2)  $4FeS_2 + 6Cl_2 + 2H_2O + 7O_2 \rightarrow$
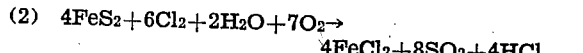
$4FeCl_2 + 8SO_2 + 4HCl$ However, if ferric chloride is wanted, the ferrous chloride residue obtained as above containing any unreacted sulphur is then treated with either weak or strong dry chlorine gas at temperatures preferably between about 180° and 230° C. to convert the same to the ferric condition, while any traces of sulphur remaining in the said residue are converted to sulphur chloride. By "dry chlorine" is meant such a gas that has been dried by the usual methods employed for such purpose, e. g. by passing through $H_2SO_4$, etc. The sulphur chloride leaves as vapor with the unreacted gases and may be separated therefrom by condensation and such sulphur chloride may then be returned to react along with chlorine upon fresh pyrites in the first step or may be otherwise utilized or disposed of, e. g. as hereinafter described.

If insufficient water vapor be contained in the chlorine gas supply, more water vapor may be conveniently added as steam. The sulphur dioxide gas evolved may be scrubbed with water to remove the hydrochloric acid, sulphuric acid, and any solid particles carried by the gas stream; and may be subsequently dried, if so desired. The so purified sulphur dioxide gas, therefore, retains any unused oxygen and the nitrogen content of the air utilized in the reaction. The supply of air relative to chlorine may be so regulated that the excess thereof is maintained at a minimum in the exit gases.

The limits of temperature best suited to carry out reaction (1) vary from about 240° to 315° C. At the lower limit sulphur begins to react strongly with oxygen, whereas at temperatures slightly lower than 240° free sulphur separates out to form a somewhat pasty mixture, which with the other materials present, makes the process difficult of working. Beyond the upper limit, however, the ferrous chloride present is oxidized by oxygen to produce a mixture of ferric chloride and oxide. Hence, the temperature limits are well defined, but the higher temperatures, i. e. 280° to 300° C. favor reaction (1), which is a result largely sought for in carrying out my process.

In reaction (2) it is desirable to keep the hydrochloric acid content in the exit gases at a minimum with respect to the sulphur dioxide formed. This relationship is known as the $SO_2/HCl$ ratio. A careful control of conditions in carrying out my process tends to bring this about, namely, keeping the temperature of reaction (1) near a maximum, for instance, from about 280° to 300° C., grinding of the pyrites during reaction, allowing fresh pyrite as good contact with exit gases as possible, and carefully limiting the moisture content of the reacting gases. Control of the temperature range of reaction, however, is the factor of greatest importance in maintaining this ratio at a maximum. The following results obtained at several temperatures will illustrate:

1. At 300° C. ---------------------- $30SO_2 : 1HCl$
2. At 280° C. ---------------------- $2SO_2 : 1HCl$
3. At 260° C. ---------------------- $1SO_2 : 1HCl$
4. At 200°–220° C. ----------------- $0.3SO_2 : 1HCl$

The data recorded above is approximate, but sufficiently accurate for the purpose in question. The $SO_2/HCl$ ratio at about 300° C. largely represents the ideal result to be realized in my process. The comparatively small quantity of HCl formed at that temperature corresponds substantially to the sulphur chloride known to result in reaction (1) with water vapor present. Equations similar to (2) might be written to represent the reactions taking place at the several temperatures shown in the above table.

In carrying out my process I prepare hot dry iron pyrites in finely divided condition, most of which will preferably pass a 200 mesh screen. This I introduce gradually into a "Wedge" or other suitable type of furnace, simultaneously with the reacting gases and with continuous stirring, introducing the chlorine at bottom in countercurrent to the descending pyrite. The gaseous products of reaction, in their course through the furnace, come thus into contact with fresh pyrite before leaving. The mixture of iron chlorides, unreacted pyrite, etc. resulting from the reaction is discharged into a second "Wedge" or other suitable furnace where it is acted upon with stirring by dry chlorine to form ferric chloride. The sulphur chloride formed in the second furnace is distilled therefrom with stirring as formed and together with any excess chlorine may be returned to the first step of the process, there added to the reaction gases, to react upon fresh incoming pyrite. The ferric chloride is removed and may be sublimed or treated by other suitable methods to purify it if so desired.

I may, however, proceed with the reaction of conversion to ferric chloride at a temperature between about 270° and 330° C. whereby the ferric chloride is sublimed as made, along with some sulphur chloride, such vapors accompanying any excess chlorine present. I may then fractionally condense the sulphur chloride and ferric chloride from the exit gas, and may then return the residual excess chlorine together with accompanying sulphur chloride to mingle with the chlorine supply to the first chlorination step or react it with iron sulphide separately whereby in either case I recover the sulphur in said exit gases. The drawing illustrates the movement of materials in the hereinbefore described process. Iron pyrites is fed to a reactor furnace together with sufficient air-chlorine mixture and water vapor to effect reaction at a temperature between about 240° and 315° C. For example, at a temperature of about 280° C., the proportions would be approximately as given in Equation (2) above. The gaseous reaction products are led off to a scrubber, wherein they are scrubbed with water to remove HCl as an aqueous solution, while $SO_2$, not being readily absorbed in the HCl solution, passes on along with the inert gases, and may be collected or further used in any desired way. The solid residue of ferrous chloride ($FeCl_2$) containing a small amount of sulphur and iron sulphide from the reactor is then conveyed to a chlorinator wherein it is reacted with dry chlorine gas to form ferric chloride ($FeCl_3$). The latter is removed as the final product. The gaseous products consisting largely of excess chlorine and some sulphur chloride are returned to the first reactor.

It will be observed that the materials used in carrying out my improved process are chlorine, iron sulphide, air, and aqueous vapor. The materials to be considered, therefore, are largely dilute chlorine and iron sulphide, the former of which is often available as a waste product from certain electrolytic processes. Pyrites is a comparatively cheap material and plentiful, and may be obtained also as a waste product from certain metallurgical processes.

The $SO_2$ gas produced by my improved process is comparable both in strength and purity with that obtained in customary methods and the ferrous chloride is in suitable condition to be dried or recrystallized as such or may be further chlorinated to the ferric condition and subsequently sublimed to obtain anhydrous ferric chloride, or sublimed coincidentally with its formation, as heretofore pointed out. Although the HCl solution formed in washing the gases of reaction may contain a small amount of sulphuric acid as impurity, yet for certain uses, as for neutralization, cleaning, etc. it is found well adapted and practical.

Chlorine diluted with air as hereinbefore described may be replaced by a mixture of chlorine and oxygen, since it is primarily the chlorine and oxygen that enter into reaction. Air dilution is the obvious natural procedure to supply the oxygen and such dilution occurs as a condition in chlorine production in certain processes, and waste chlorine is also available diluted with air. By dilute chlorine I accordingly mean chlorine containing oxygen with or without other inert gaseous constituents such as nitrogen. With straight air dilution, the proper Cl/O ratio is established in a mixture of air and chlorine containing about 15 per cent chlorine.

It has been proposed heretofore to work at temperatures above 315° C., but this was found entirely unpractical, because a too great quantity of the elemental sulphur incidentally freed remained in the reaction mass unacted upon by the chlorine. At higher temperatures, however, such sulphur volatilized readily and was removed and condensed as such and the iron chlorides formed were roasted to form iron oxide with the removal of free chlorine which was subsequently used to contact with more iron sulphide. The products of such methods are iron oxide and free sulphur, and the chlorine was cycled in the process. In my process, however, I operate at a temperature between 240° and 315° C. and obtain ferric chloride and sulphur dioxide.

My invention accordingly, provides a novel method of producing ferrous chloride or ferric chloride, or both, together with sulphur dioxide, from cheap raw iron sulphide and chlorine gas of low strength, the economic use of which latter is usually a problem. I have determined and disclosed the temperature and other conditions required to effect these ends, and avoid the difficulties otherwise inherent. My method is easily practiced and the products are of merchantable quality and valuable.

Other modes of applying the principle of my invention may be employed instead of those explained, change being made as regards the process herein disclosed, provided the means stated by any of the following claims or the equivalent of such stated means be employed.

I therefore particularly point out and distinctly claim as my invention:—

1. In a process for the preparation of iron chlorides and sulphur dioxide conjointly, the step which consists in reacting iron sulphide with dilute chlorine containing oxygen in which the ratio of the chlorine gas to the oxygen does not exceed 1:1 at a temperature between approximately 240° and 315° C.

2. In a process for the preparation of iron chlorides and sulphur dioxide conjointly, the step which consists in reacting iron sulphide with a mixture of chlorine and air in which the ratio of chlorine to oxygen does not exceed 1:1 at a temperature above about 280° C. but not exceeding 315° C.

3. In a process for the preparation of iron chlorides and sulphur dioxide conjointly, the step which consists in reacting iron sulphide with a mixture of air, chlorine and water vapor at a temperature between approximately 240° and 315° C., the ratio of the chlorine gas to the oxygen not exceeding 1:1.

4. In a process for the preparation of iron chlorides and sulphur dioxide conjointly, the steps which consist in reacting iron sulphide with a mixture containing chlorine and oxygen, in which the ratio of chlorine gas to oxygen does not exceed 1:1 at a temperature between approximately 240° and 315° C., until the evolution of sulphur dioxide has substantially ceased, and then subjecting the residue containing ferrous chloride to the action of dry chlorine.

5. In a process for the preparation of iron chlorides and sulphur dioxide conjointly, the steps which consist in reacting iron sulphides with a mixture containing chlorine and air in which the ratio of chlorine gas to oxygen does not exceed 1:1 and in the presence of water vapor at a temperature between approximately 240° and 315° C., until the evolution of sulphur dioxide has substantially ceased, subjecting the residue consisting mainly of ferrous chloride, to the action of hot dry chlorine at a temperature between 270° and 330° C. to produce ferric chloride and a small amount of sulphur chloride vapor, and separating the latter two materials by fractional condensation.

6. In a process for the preparation of iron chlorides and sulphur dioxide conjointly, the steps which consist in reacting powdered iron sulphide with a mixture of air and chlorine, in which the ratio of chlorine to oxygen does not exceed 1:1, in the presence of water vapor at a temperature between about 240° and 315° C., whereby a solid product consisting chiefly of ferrous chloride is formed and a gaseous mixture of sulphur dioxide and hydrochloric acid is evolved, and removing the hydrochloric acid from the sulphur dioxide in such gases by scrubbing with water.

CARL F. PRUTTON.